Patented Aug. 15, 1933

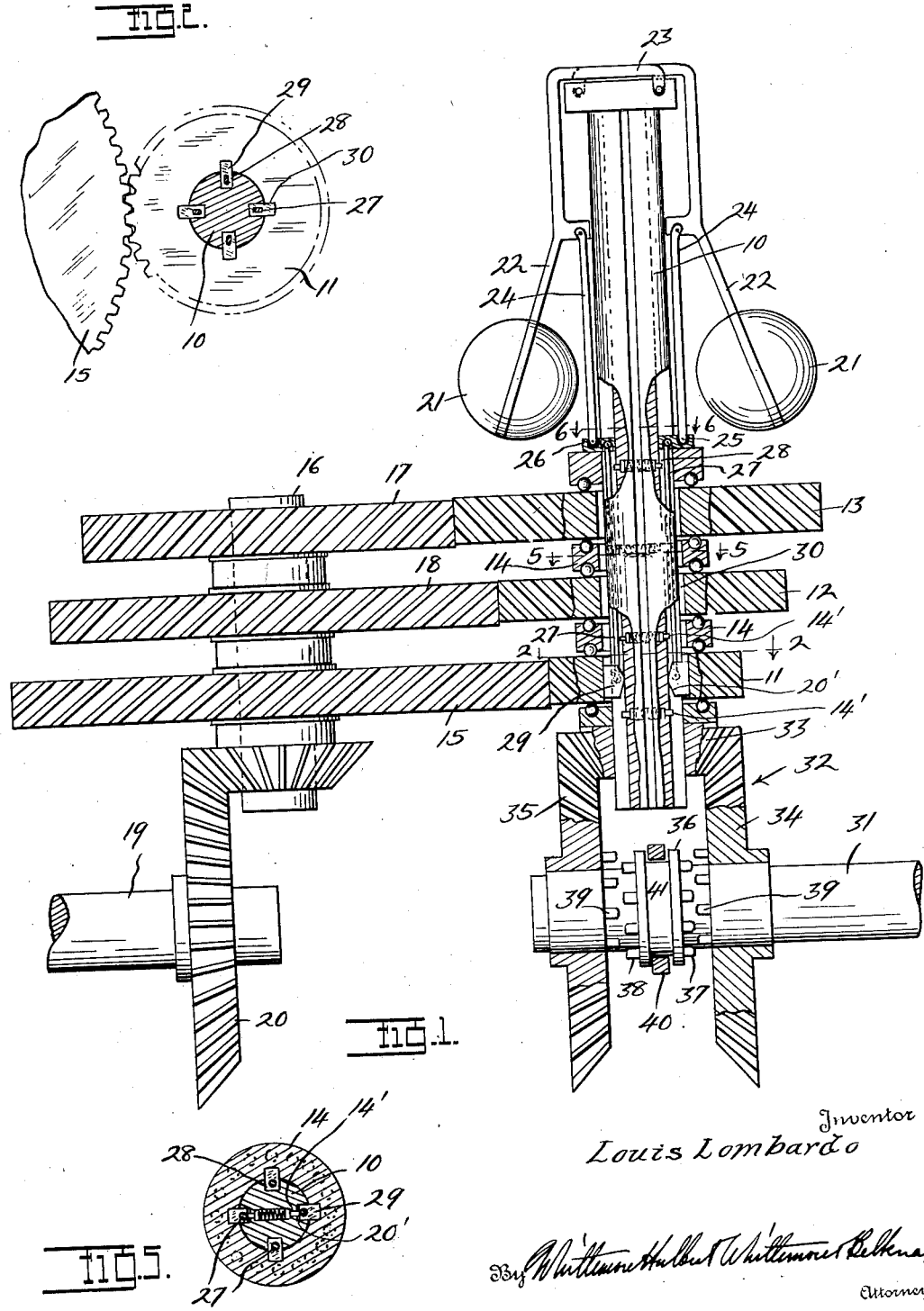

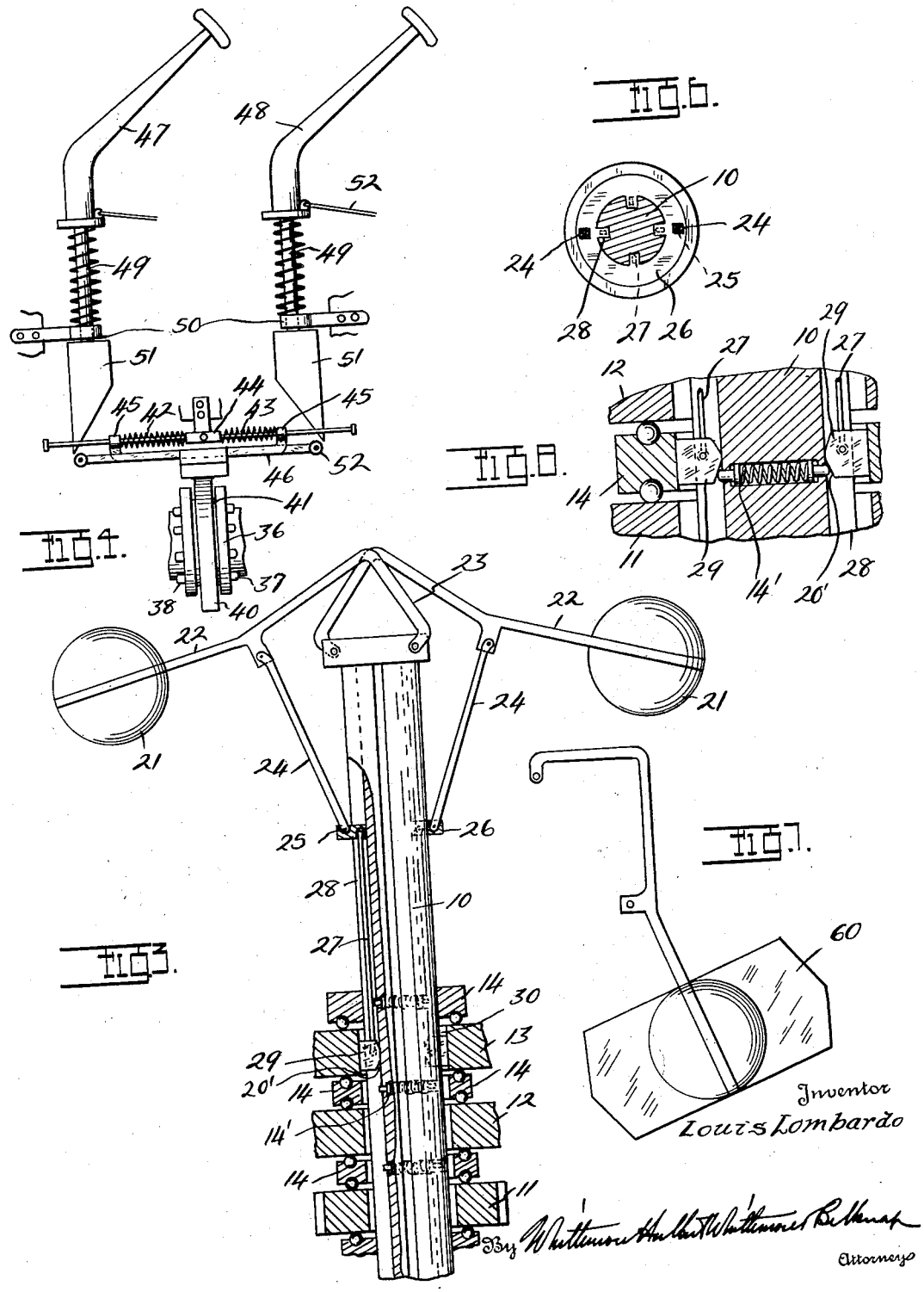

1,922,624

UNITED STATES PATENT OFFICE 1,922,624

AUTOMATIC VARIABLE SPEED TRANSMISSION

Louis Lombardo, Detroit, Mich.

Application March 28, 1932. Serial No. 601,636

2 Claims. (Cl. 74—97)

This invention relates generally to variable speed transmissions and refers more particularly to improved means for automatically effecting different gear ratios in the transmission.

Although the present invention may be employed in association with numerous different types of variable speed transmissions, nevertheless, it finds particular utility when utilized in connection with motor vehicles for driving the vehicle at different speeds.

One of the principal objects of this invention resides in the provision of means for automatically varying the gear ratio between the drive and driven shafts in dependence upon the speed of rotation of the latter shaft.

Another object of the present invention resides in the provision of means of the foregoing character capable of being employed in a variable speed transmission wherein the several change speed ratios may be obtained by constantly meshing gears of the helical type. This latter arrangement is desirable since it provides for obtaining efficient and quiet operation of the transmission.

A still further advantageous feature of this invention resides in the provision of a transmission possessing the foregoing features and having means automatically operable upon idling the engine of the vehicle to disconnect the same from the drive wheels of the latter and thereby permit the vehicle to coast.

The foregoing as well as other objects will be made more apparent as this description proceeds, especially when considered in connection with the accompanying drawings, wherein:

Figure 1 is a diagrammatic sectional view illustrating a variable speed transmission constructed in accordance with this invention;

Figure 2 is a cross sectional view taken substantially on the line 2—2 of Figure 1;

Figure 3 is a fragmentary view similar to Figure 1 showing the parts in a different position;

Figure 4 is a diagrammatic view featuring the operating mechanism for the transmission;

Figure 5 is a sectional view taken substantially on the line 5—5 of Figure 1;

Figure 6 is a sectional view taken substantially on the line 6—6 of Figure 1;

Figure 7 is a fragmentary diagrammatic view illustrating a slightly modified form of construction;

Figure 8 is a fragmentary sectional view illustrating the action of the spring detents upon the sliding keys.

The variable speed transmission shown herein for the purpose of illustration is capable of effecting three different forward speed ratios and also three corresponding reverse speed ratios. In general, the transmission comprises a vertically extending driven shaft 10 having three axially spaced change speed gears 11, 12 and 13 mounted thereon for rotation relative thereto. The aforesaid change speed gears vary in diameter in accordance with the desired gear ratios and are normally maintained in spaced relation to each other by means of suitable thrust bearings 14 fixed to the driven shaft intermediate the gears. The relatively small gear 11 will be referred to hereinafter as the low speed gear and is arranged in constant mesh with a comparatively larger gear 15 fixed to a suitable countershaft 16. The upper gear 13 is also arranged in constant mesh with a corresponding gear 17 fixed to the countershaft and, in the present instance, is the same size as the latter gear so as to effect substantially a 1:1 ratio between the driven and countershafts. The intermediate gear 12 likewise is arranged in constant mesh with a cooperating gear 18 fixed to the countershaft and the relative diameters of the two aforesaid gears is such as to provide for operatively connecting the driven and countershafts through a ratio less than the ratio secured by the cooperating gears 11 and 15 and greater than the ratio secured by the gear trains 13 and 17. The countershaft necessarily extends in the same direction as the driven shaft and the lower end thereof is operatively connected to a suitable power take-off shaft 19 through the intermediary of the intermeshing beveled pinions 20. By providing an arrangement of the above character wherein the change speed gears are arranged in constant mesh, it will be observed that each of the gears may be of the helical type, if desired, so as to provide quiet and efficient operation.

From the foregoing, it will be observed that the speed of the power take-off shaft 19 may be progressively increased by successively operatively connecting the gears 11, 12 and 13 to the driven shaft. In the present instance, the aforesaid change speed gears are automatically connected to the driven shaft in dependence upon the speed of rotation of the latter. For accomplishing the above results, I provide a pair of accurately balanced centrifugal weights 21 arranged upon diametrically opposite sides of the driven shaft and operatively connected to the upper end of the latter for outward swinging movement. As shown, the weights 21 are secured to suitable arms 22 having inwardly extending portions 23 at the upper ends thereof suitably pivotally connected to the adjacent end of the driven shaft. In the event it is desired to minimize the space occupied by the weights when in their outermost positions, the inner end portions 23 of the arms are preferably arranged to overlap or cross each other as shown in Figures 1 and 3 so that the weight on one side of the driven shaft will swing about an axis located on the opposite side of the shaft. The arms 22 are pivotally connected intermediate the ends thereof to the upper ends of suitable rods 24 having the lower ends thereof pivotally connected as at 25 to a collar 26. The collar 26 is splined upon the driven shaft above the change speed gear 13 for non-rotative axial movement relative to the shaft and is pivotally connected at circumferentially spaced points to a plurality of shifter rods 27 for actuating the latter. The rods 27 extend downwardly from the collar 26 in the direction of the axis of the driven shaft and are arranged in suitable slots 28 formed in the driven shaft paralel to the axis thereof. The lower ends of the shifter rods 27 are connected to keys 29 slidably mounted within the slots 28 and fashioned to engage within corresponding keyways 30 formed in the change speed gears 11, 12 and 13. The keyways 30 extend for the full width of the gears so as to provide for unobstructed travel of the keys 29 from the lowermost change speed gear 11 to the upper change speed gear 13. While the keyways 30 in each of the change speed gears must necessarily be spaced circumferentially of each other a distance corresponding exactly to the spacing of the slots 28 in the driven shaft, nevertheless, it is to be understood that each change speed gear may be provided with two or more sets of keyways so as to facilitate engagement of the keys 29 with the respective gears. The rods 27 are located within the slots 28 within the periphery of the driven shaft so as not to interfere with rotation of the change speed gears relative to the latter shaft, and the length of the rods is so determined that when the weights are in their inoperative position shown in Figure 1, the keys 29 on the lower ends of the shifter rods assume a position within the low speed gear 11 for operatively connecting the latter to the driven shaft.

The drive shaft 31 extending from the engine (not shown) of the vehicle is arranged with its axis of rotation at substantially right angles to the axis of rotation of the driven shaft, and the latter is operatively connected to the former for actuation thereby by suitable gearing designated generally herein by the reference character 32. The aforesaid gearing comprises a beveled gear 33 fixed to the lower end of the driven shaft and arranged in constant mesh with corresponding beveled gears 34 and 35 freely rotatably mounted upon the drive shaft 31 in axial spaced relation to each other. Splined upon the drive shaft 31 intermediate the beveled gears 34 and 35 is a suitable clutch 36 having two sets of clutch teeth 37 and 38 selectively engageable with corresponding teeth 39 formed on the gears 34 and 35, respectively. The arrangement is such that movement of the clutch 36 into intermeshing relationship with the gear 34 drives the driven shaft in a direction to effect forward movement of the vehicle, and movement of the clutch 36 into intermeshing relation with the gear 35 rotates the driven shaft in the opposite direction so as to permit reversing the vehicle.

For selectively operating the clutch 36, I provide a shifting fork 40 engageable within an annular recess 41 in the clutch and normally maintained in a position wherein said clutch is disengaged from both of the gears 34 and 35 by means of the balancing springs 42 and 43. The inner ends of the springs 42 and 43 engage opposite sides of a fixed abutment 44, while the outer ends of the springs engage abutments 45 located upon opposite sides of the fork and carried by a suitable bracket member 46 secured intermediate the ends thereof to the fork. Both the springs 42 and 43 are of the same strength so that in the normal position of the parts, they serve to maintain the clutch 36 in its neutral position shown in Figure 1. The fork 40 is positively actuated to selectively move the clutch 36 in opposite directions by means of a pair of controls 47 and 48 preferably in the form of pedals capable of being manipulated by the feet of the operator. Each of the aforesaid controls is provided with plungers 49 slidably supported within fixed brackets 50 and having cams 51 secured to the lower ends thereof in a position to engage suitable rollers 52 journaled upon the ends of a bracket member 46.

The foregoing arrangement is such that when the pedal 47 is depressed, the fork 40 will be moved axially of the drive shaft 31 to engage the clutch 36 with the gear 34 and thereby operatively connect the driven shaft to the engine in such a manner as to cause forward motion of the vehicle. In this connection, it is to be noted that movement of the fork in the aforesaid direction by the pedal 47 compresses the spring 42 so that when the pedal is released, this latter spring will automatically return the fork and, accordingly, the clutch 36 to their normal positions shown in Figure 1 wherein the driven shaft is disconnected from the drive shaft. In the event the operator desires to reverse the direction of movement of the vehicle, the control 48 is depressed whereupon the fork is actuated in the same manner as hereinbefore set forth to engage the clutch 36 with the gear 35 which, as previously stated, effects a rotation of the driven shaft 10 from the drive shaft in a reverse direction. If desired, both controls 47 and 48 may be independently operatively connected by means of a Bowden wire control 52 to the throttle (not shown) of the engine so that when either pedal is depressed, the throttle is opened in dependence upon the degree of depression of the pedals and so that when the latter are released, the throttle is permitted to close in the usual manner. By providing springs for automatically returning the clutch 36 to its neutral position when either of the pedals are released and by interconnecting the controls to the engine throttle in the manner specified, the operator may effect coasting of the vehicle by merely removing his foot from the control with which it is engaged. This latter arrangement is advantageous since it provides for obtaining many of the recognized advantages of so-called "free wheeling" without the necessity of providing complicated and inefficient overrunning clutch mechanisms.

*Operation*

Assuming that the parts of the transmission are in their neutral positions shown in Figure 1 and that the drive shaft 31 is disconnected from the engine by the usual clutch mechanism (not shown), it will be noted that the operator in order to effect forward movement of the vehicle merely depresses the pedal 47. As previously stated, depression of the pedal 47 causes the fork 40 to move the clutch 36 into engagement with the beveled gear 34 to secure the same to the drive shaft 31. The latter is then connected to the engine by suitable manipulation of the clutch mechanism (not shown herein) whereupon the driven shaft is rotated from the drive shaft by the intermeshing gears 33 and 34. Inasmuch as the keys 29 normally connect the low speed gear 11 to the driven shaft, it will be apparent that as soon as the latter is rotated by the drive shaft, motion will be imparted to the power take-off shaft 19 to propel the vehicle. As the operator increases the speed of the engine by continued depression of the pedal 47, the angular velocity of the driven shaft correspondingly increases tending to move the centrifugal weights to their outermost positions. As the speed of the driven shaft increases, the weights move outwardly, and in so doing exert an upward pull upon the rods 24 and collar 26. Movement of the collar 26 upwardly axially of the driven shaft by the weights effects a corresponding movement of the keys 29 through the intermediary of the shifter rods 27. Continued upward movement of the keys 29 by the centrifugal weights 21 effects a movement of the former into engagement with the second speed gear 12 to secure the latter to the driven shaft. The keys are retained in this position until the driven shaft has achieved sufficient speed to move the weights to their outermost positions whereupon the keys 29 are moved upwardly by the collar and shifter rods into engagement with the high speed gear 13 for securing the latter to the driven shaft. The foregoing arrangement is such that when the torque required by the power take-off shaft is equal to or less than that supplied by the engine, the weights are in their outermost positions so as to maintain the transmission in high gear. If desired, suitable spring detents 14' may be located in the thrust washers on opposite sides of the second speed gear 12 in such a manner as to engage cam surfaces 20' on the keys 29 to facilitate engagement of the keys with the change speed gears.

When the torque required by the propeller shaft is greater than the torque supplied by the engine, the speed of rotation of the driven shaft decreases and the weights accordingly move downwardly. Downward movement of the weights causes a sliding movement of the keys in a corresponding direction to successively engage the same with the second and low speed gears 12 and 11, respectively. The arrangement is such that in the event the vehicle encounters a steep hill when in high gear, the transmission automatically goes into a lower gear depending upon the torque required by the power take-off shaft and irrespective of whether the throttle is maintained open by the operator.

In this connection, it is to be noted that the transmission also automatically goes into the low gear when the operator releases the control 47.

Assuming now that the control 47 is in its released position and the operator desired to reverse the vehicle, he merely depresses the control 48 to move the clutch 36 into meshing relation with the gear 35 as previously stated. Inasmuch as this reverse gearing is in advance of the variable speed gearing in the transmission proper, as shown in Figure 1, it will be seen that the same ratios may be secured in reverse as in a forward speed.

Referring to the modification of the invention illustrated in Figure 7, it is to be noted that this embodiment of the invention differs from the one previously described only in the construction of centrifugal weights 60. As shown in the above figure, the weights 60 are designed to facilitate outward movement thereof by the speed of rotation of the driven shaft.

What I claim as my invention is:

1. A power transmitting unit for motor vehicles comprising, a drive shaft, a driven shaft, a power take-off shaft, variable ratio means for operatively connecting the driven and power take-off shafts to rotate the latter at different speeds from the former, means for operatively connecting the driven shaft to the drive shaft including a gear freely rotatably mounted on the latter shaft, a second gear fixed to the driven shaft and arranged in constant mesh with the drive gear, means operable in dependence upon manipulation of a control for accelerating the drive shaft to automatically connect the drive gear to the latter shaft, and means operable in dependence upon the speed of rotation of said driven shaft for automatically varying the ratio between the latter and power take-off shaft.

2. A power transmitting unit for motor vehicles comprising, a drive shaft, a driven shaft, a power take-off shaft, variable ratio means for operatively connecting the driven and power take-off shafts to rotate the latter at different speed from the former, means for operatively connecting the drive and driven shafts including a pair of gears freely rotatably mounted on the drive shaft in axial spaced relation, a gear fixed to the driven shaft and constantly meshing with both gears on the drive shaft, a clutch splined upon the drive shaft between said gears and selectively engageable therewith to rotate the driven shaft in opposite directions, means normally maintaining said clutch out of engagement with the aforesaid gears, means automatically operable upon selective manipulation of two vehicle controls for moving said clutch in opposite directions axially of the drive shaft, and means operable in dependence upon the speed of rotation of said driven shaft for automatically varying the ratio between the latter and power take-off shaft.

LOUIS LOMBARDO.